A. L. HARVEY.
HORSE CONTROLLING OR HITCHING DEVICE.
APPLICATION FILED SEPT. 28, 1909.
959,135.
Patented May 24, 1910.
2 SHEETS—SHEET 1.
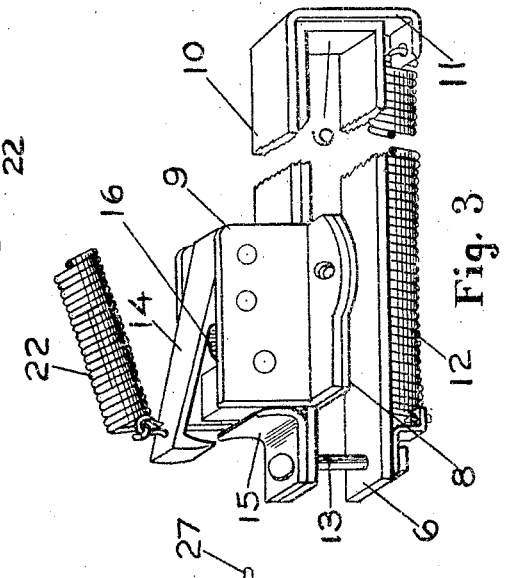
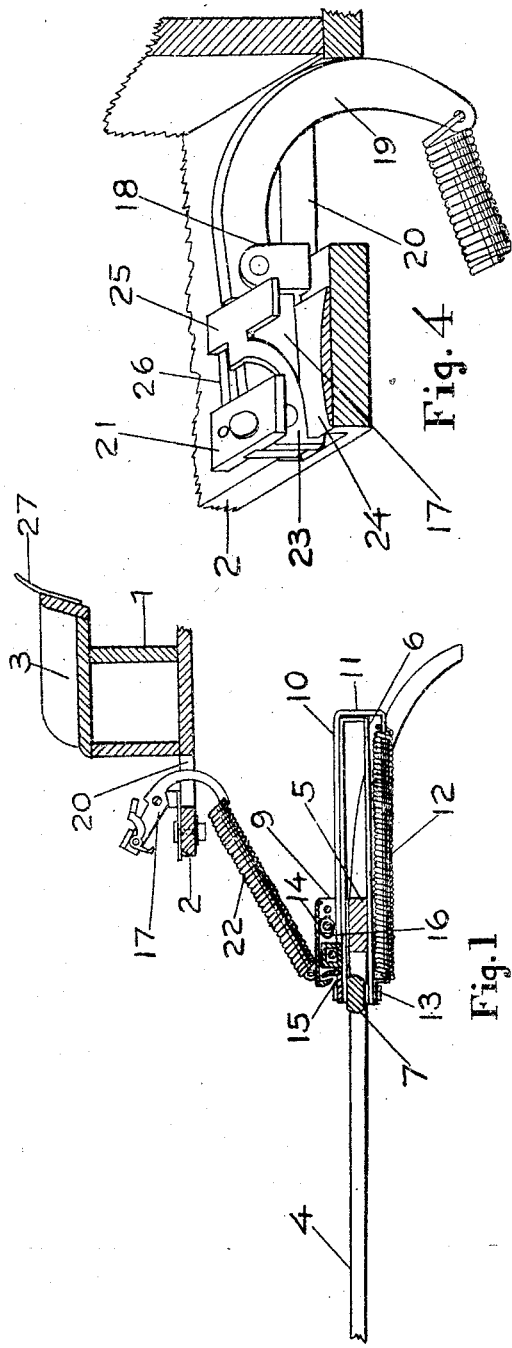
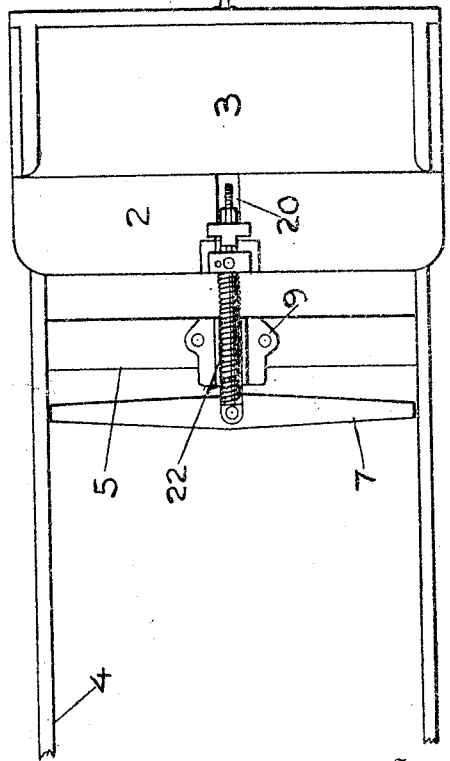

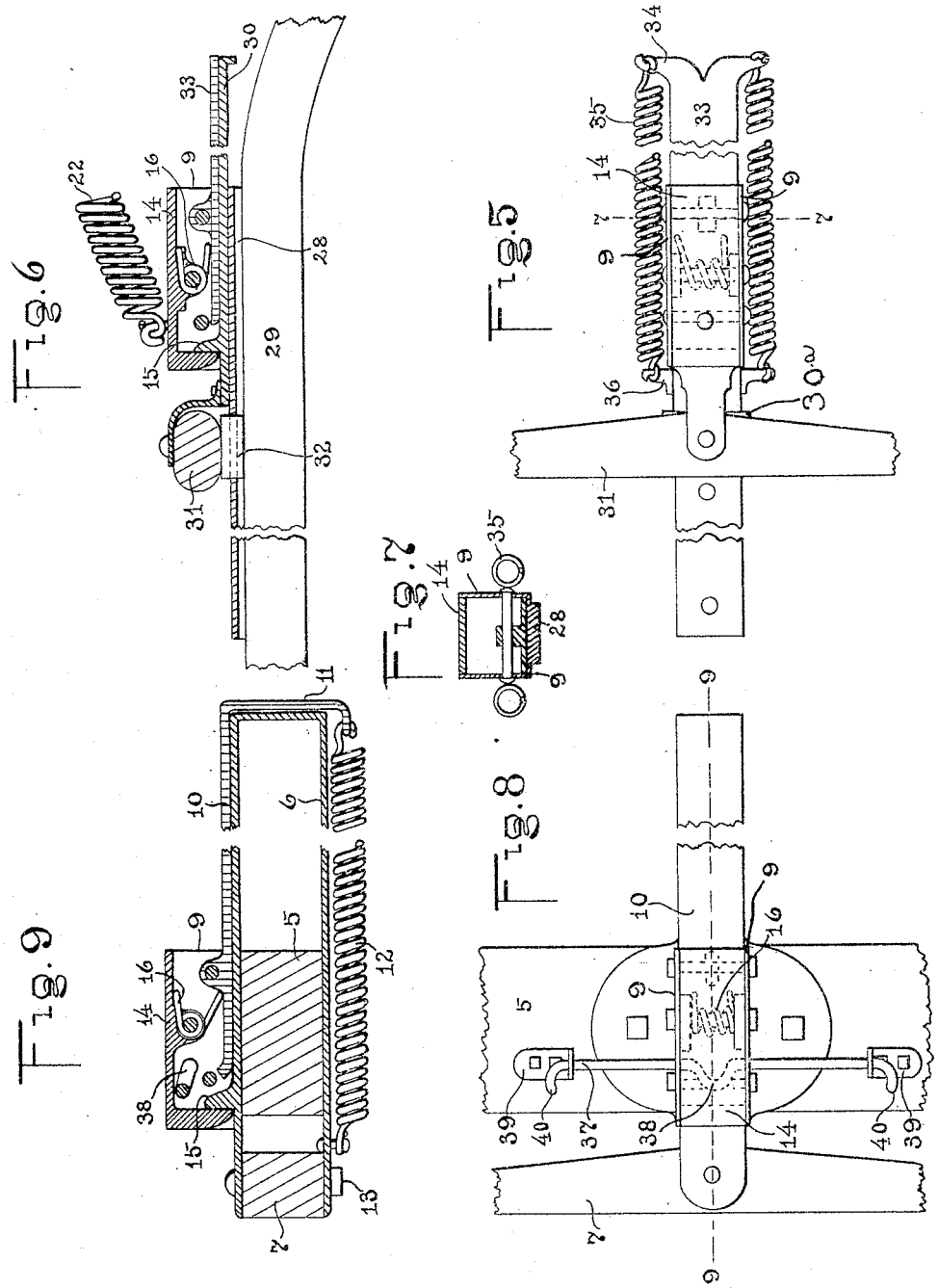

UNITED STATES PATENT OFFICE.

ALLEN L. HARVEY, OF SALEM, OREGON.

HORSE CONTROLLING OR HITCHING DEVICE.

959,135.   Specification of Letters Patent.   Patented May 24, 1910.

Application filed September 28, 1909. Serial No. 519,918.

*To all whom it may concern:*

Be it known that I, ALLEN L. HARVEY, a citizen of the United States, residing at Salem, in the county of Marion and State of Oregon, have invented certain new and useful Improvements in Horse Controlling or Hitching Devices; and I do hereby declare the following to be a full, clear, and exact description of the invention, such as will enable others skilled in the art to which it appertains to make and use the same.

My invention relates to new and useful improvements in horse controlling or hitching devices for animals and my object is to provide means for securing the animal and preventing the animal from moving the vehicle forwardly.

A further object is to provide means for movably mounting the swingle tree to the vehicle.

A still further object is to provide means for holding the swingle tree against forward movement when the vehicle is being drawn and a still further object is to provide means for yieldably holding the swingle tree when the animal is to be held against forward movement.

Other objects and advantages will be hereinafter referred to and more particularly pointed out in the claims.

In the accompanying drawings forming part of this application, Figure 1 is a vertical central section of the front portion of a vehicle, showing my improved attachment thereon. Fig. 2 is a plan view thereof. Fig. 3 is a detail perspective view of the sliding attachment and holding device for the swingle tree. Fig. 4 is a detail perspective view of the releasing device. Fig. 5 is a top plan view showing the manner of attaching the releasing device to a tongue. Fig. 6 is a longitudinal central sectional view thereof. Fig. 7 is a transverse sectional view as seen on line 7—7, Fig. 5. Fig. 8 is a top plan view of a slightly modified form of device, and, Fig. 9 is a sectional view thereof as seen on line 9—9, Fig. 8.

Referring to the drawings in which similar reference numerals designate corresponding parts throughout the several views, 1 indicates the forward end of a vehicle, preferably of that type used for delivery purposes, the forward portion of the bed of the vehicle terminating in a foot board 2 and extending upwardly from the bed is a seat 3. Attached to the forward portion of the running gear of the vehicle are shafts 4, which shafts are connected together by the usual form of cross bar 5 and slidably mounted on said cross bar is a clevis 6, between the open ends of which is secured a swingle tree 7, to which the animal is to be attached for drawing the vehicle. The clevis 6 passes over a plate 8 on the upper face of the cross bar 5 and between ears 9 extending upwardly from said plate, the clevis being of such length as to permit the swingle tree to move a considerable distance forwardly when desired and in order to return the clevis and swingle tree to their rearward positions, a substantially L-shaped frame 10 is extended rearwardly from the cross bar 5 and over the clevis 6, the forward end of the frame being fixed between the ears 9 and to the depending portion 11 of the frame is attached one end of a spring 12, the opposite end of the spring being secured in any preferred manner to the bolt 13 employed for holding the swingle tree into engagement with the clevis. In this manner it will be readily seen that as the frame 10 is stationary, it is possible that any forward pull on the swingletree, after the latch has been released, would draw forwardly the clevis 6 and simultaneously stretch the spring 12, one end of which is secured to said frame and the opposite end to portions of the sliding clevis. As soon as the pull on the swingletree is released, however, the tension of said spring 12 will draw said clevis carrying the swingletree back to its normal position. The swingle tree is normally held adjacent the cross bar 5 by means of a latch 14, the rear end of which is pivotally secured between the ears 9, while the forward end of said latch projects forwardly of the cross bar and in position to engage a keeper 15 carried by the upper end of clevis 6, the bolt 13 employed for holding the swingle tree in engagement with the clevis, also retaining the keeper in position on the swingle tree and clevis. The latch 14 is normally held in its lowered position by means of a spring 16, which is positioned between the ears 9 and arranged to direct upward pressure on the rear end of the latch or a point in the rear of its pivot, thereby normally holding the engaging end of the latch in position to engage the upwardly extending portion of the keeper 15, the engaging portion of the latch and keeper being preferably tapered, whereby when moved into engagement with each other on the rearward movement of the clevis, the latch will ride over the keeper. In order to release the latch from the keeper while on the vehicle seat, a lever 17 is pivotally secured to a bracket 18 carried by the foot board 2, said lever being provided with a curved arm 19, which extends downwardly through a slot 20 in the foot board, the forwardly extending portion of the lever having a tread plate 21, whereby pressure may be applied to operate the lever by the driver placing his foot thereon. A spring 22 is attached at one end to the curved arm 19 and at its opposite end to the forward end of the latch 14, so that when downward pressure is directed on the forward portion of the lever 17, the forward end of the latch 14 will be elevated and released from the keeper, so that should the animal attached to the vehicle, move forwardly, the swingle tree will likewise move forwardly, while the vehicle remains stationary, the tension of the spring not being sufficient to move the vehicle forward. The lever 17 is held in its lowered position by means of a catch 23, which catch is pivotally secured to the lever and in position to engage the forward edge of the base 24 of the bracket 18, the opposite end of the catch having a cross head 25 thereon, which extends above the lever and in position to receive pressure from the foot of the driver, whereby when downward pressure is directed on said cross head, the catch will be released from the base. The catch is normally held in position to engage the base by means of a spring 26, one end of which spring is fixed to the lever and the opposite end extended below the cross head and in position to direct upward pressure thereon.

In operation, the driver directs a slight rearward pull on the driving reins, thus positioning the animal adjacent the swingle tree with the traces left slack, when the driving reins are attached to a standard 27 at the rear of the seat 3 and by drawing the reins substantially taut previous to securing the same to the standard, any forward movement of the animal will cause the reins to operate the bit in the animal's mouth. Now should the horse become frightened and take a sudden lunge forward, the reins being taut, will cause the bit to play vigorously upon the mouth of the animal, but by twitching and turning his head one way or the other, his body will be allowed to move somewhat forward, thereby taking up the slack of the traces and also drawing the spring-held swingletree forward, but the vehicle will be left stationary since the tension of the spring will not be sufficient to move it. As the horse becomes quieted, the spring 12 will draw the swingletree back in its normal position, thus overcoming the difficulties experienced by drivers using similar devices without such springs. It will thus be seen that no matter how spirited a horse may be, with such a device, as herein described, being put into use, the animal may be left without a weight and the driver may be assured that there will be no run-away. As soon as it is desired to travel forwardly, the driver directs pressure on the cross head 25 and releases the catch from the base of the bracket, whereupon the spring 16 will lower the latch and move the same into engagement with the keeper 15 and it will be readily seen that as long as the latch is in engagement with the keeper, the swingle tree will be held in a fixed position adjacent the cross bar and the vehicle drawn forwardly in the usual manner. It will likewise be seen that by holding the animal in this manner, the usual requirements for a weight or strap will be dispensed with and further that the animal may be quickly secured or released.

In Figs. 5, 6 and 7 of the drawings I have shown means for attaching the device to a pole or tongue, in which instance the ears 9 are connected to a base 28, which base is of considerable length and secured to the pole 29 and on said base is slidably mounted a bar 30, which carries the keeper 15, the forward end of the bar 30 extending a distance beyond the keeper 15. An additional bar 30ª extending transversely to bar 30 is secured to the under side of a doubletree 31, said bar being extended downwardly and inwardly at its edges to form channels 32, which are adapted to engage and slide upon the edges of the base 28 and as the bar 30 passes between the ears 9, said bar will be properly guided and held in position over the tongue. Fixed between the ears 9 and immediately above the bar 30 is a blade 33, which extends a distance from the rear ends of the ears 9 and has its inner end bifurcated to form arms 34, which arms are extended at right angles to the trend of the blade and have engaged therewith one end of springs 35, the opposite ends of said springs being engaged with extensions 36 carried by the bar 30, so that when said bar is moved forwardly, a tension will be exerted on said springs and by providing the springs the double tree and parts to which it is secured, will be returned to their initial positions when the forward pull is released from the double tree.

In Figs. 8 and 9 I have shown a device in which the releasing lever is dispensed with and a crank shaft 37 employed for releasing the latch from the keeper, that portion of the crank shaft extending between the ears 9 having a crank portion 38, which when turned to a certain position, will raise the latch and permit the keeper and parts to which it is attached, to move forwardly, the ends of the crank shaft being extended outwardly to a point adjacent the shafts of the vehicle where they are introduced through clips 39 and then bent upwardly to form handles 40 and it will be readily seen that by lifting said handles or moving the same in the arc of a circle, rearwardly, the crank 38 will be elevated and moved into engagement with the lower face of the latch 14, thereby elevating the latch and releasing the same from the keeper and it will likewise be seen that as soon as the crank has assumed a vertical position or slightly beyond a vertical position rearwardly, it will form a prop for the latch and hold the same elevated until the crank is again lowered. By this construction it will be readily seen that the lever 17 is entirely dispensed with and the shaft 37 substituted therefor and as the ends of the shaft are extended to a point adjacent the shafts of the vehicle, the handle sections will always be in position to be readily grasped and operated by the driver when leaving the vehicle.

What I claim is:

1. In a device of the class described, the combination with parts of a vehicle, and a swingle tree; of a slidably mounted clevis, means to attach the swingletree to the clevis, a latch adapted to engage parts of the clevis and hold the same against longitudinal movement, a manually actuated lever, means of connection between said latch and said lever resiliently actuated means adapted to hold said lever in such position as to effect the retention of said latch disengaged from said clevis.

2. In a device of the class described, the combination with parts of a vehicle and means by which one or more animals may be attached to the vehicle; of slidably mounted means for carrying the animal securing parts, a keeper on said sliding means, a spring actuated latch adapted to engage said keeper and hold the sliding means against movement, means to disengage said latch from the keeper, and a spring adapted to return the sliding means to its normal position.

3. In a device of the class described, the combination with a vehicle and means for the attachment of one or more animals thereto, of slidably mounted means for carrying the animal attaching parts, a keeper arranged upon said sliding means, a spring actuated latch adapted to engage said keeper and hold said sliding means against movement, means to disengage said latch from said keeper, a spring adapted to return said sliding means to its normal position, means for holding said latch disengaging means in lowered position when said latch is elevated or disengaged from said keeper.

4. In a device of the character described, the combination with a vehicle and means for the attachment of one or more animals thereto; of slidably mounted means for carrying the animal attaching parts, a frame through which said sliding means operates, a spring-operated latch carried by said frame, a keeper on said sliding means adapted to be engaged by said latch, means to disengage said latch from said keeper to allow the forward movement of the sliding means and additional means to automatically force the sliding means to its normal position.

In testimony whereof I have signed my name to this specification in the presence of two subscribing witnesses.

ALLEN L. HARVEY.

Witnesses:
GRANT CORBY,
CLIFFORD M. ROBERTS.